May 9, 1961            R. S. EVANS            2,983,396
DROP CRADLE TRAILER
Filed March 28, 1958            3 Sheets-Sheet 1
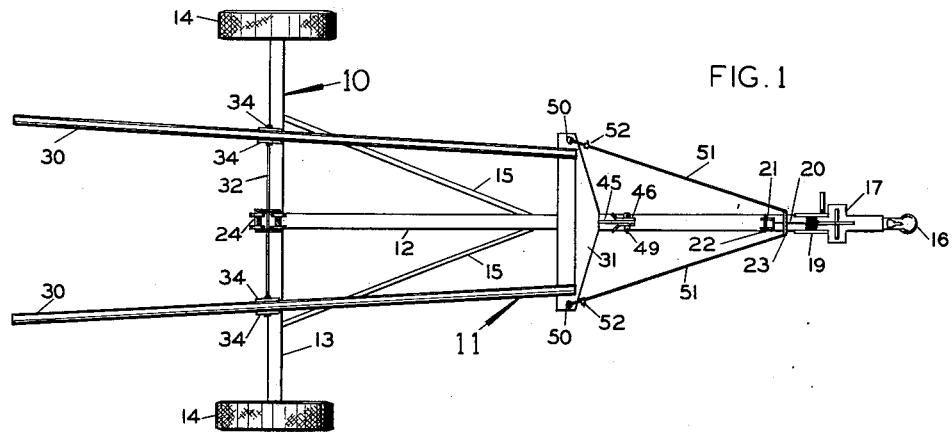
FIG. 1
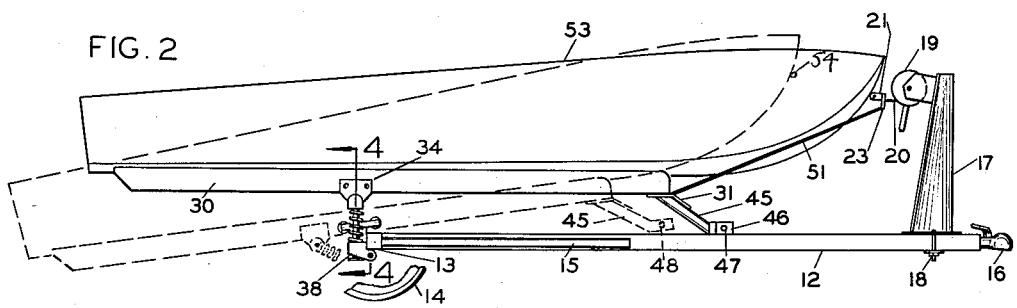
FIG. 2
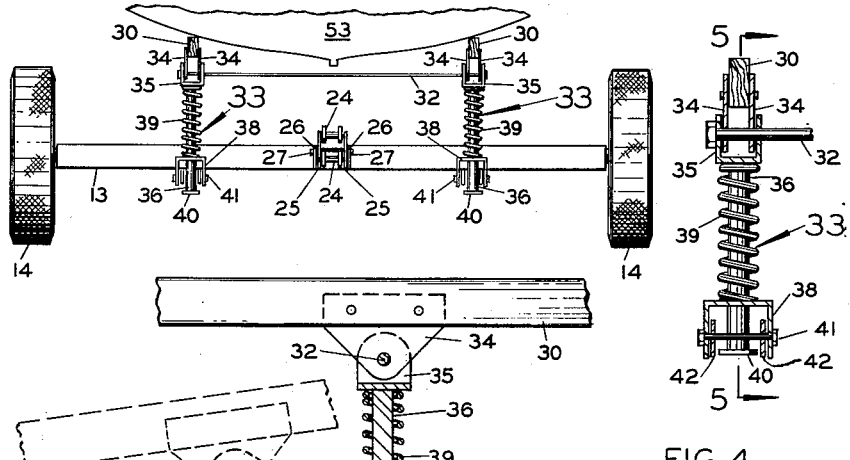
FIG. 3
FIG. 4
FIG. 5
INVENTOR.
RALPH S. EVANS
BY
*Salvatore G. Militana*
ATTORNEY May 9, 1961 R. S. EVANS 2,983,396
DROP CRADLE TRAILER Filed March 28, 1958 3 Sheets-Sheet 2

*INVENTOR.*
RALPH S. EVANS
BY
*Salvatore G. Militana*
ATTORNEY

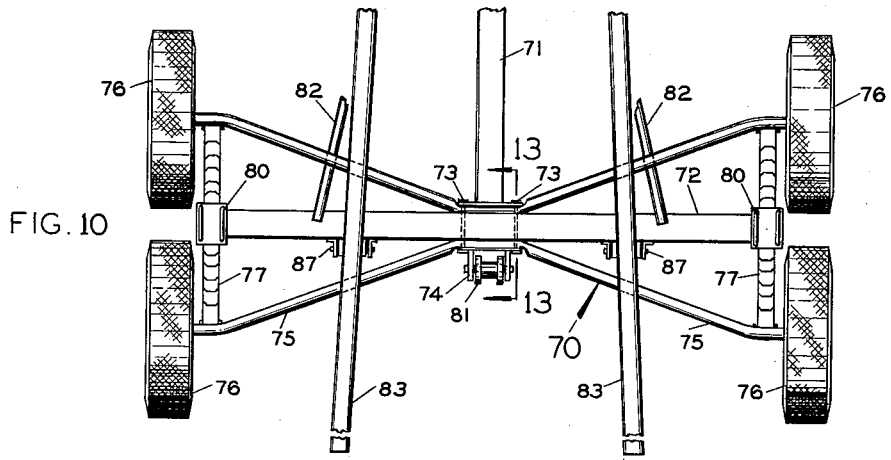
FIG. 10
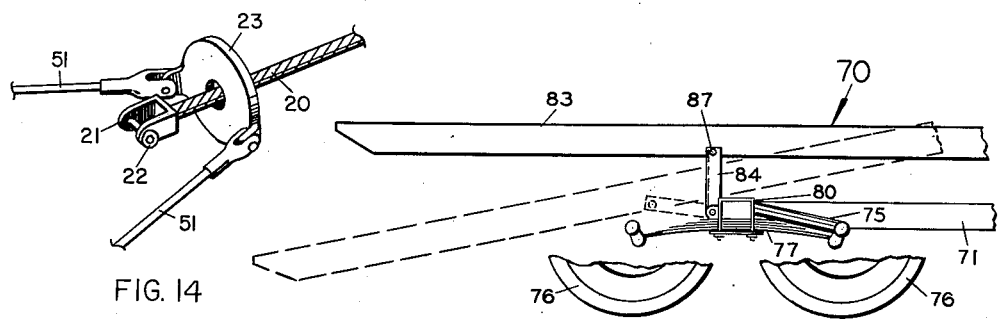
FIG. 14
FIG. 11
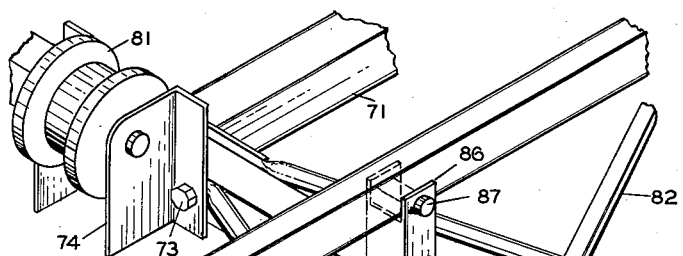
FIG. 12
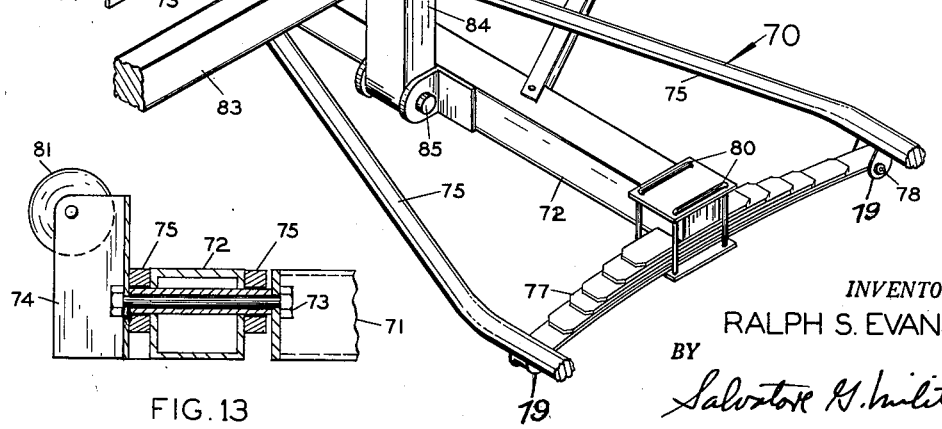
FIG. 13
INVENTOR.
RALPH S. EVANS
BY
*Salvatore G. Militana*
ATTORNEY

United States Patent Office 2,983,396
Patented May 9, 1961

2,983,396

DROP CRADLE TRAILER

Ralph S. Evans, Miami, Fla.
(4711 NW. 170th St., Opa-locka, Fla.)

Filed Mar. 28, 1958, Ser. No. 724,644

6 Claims. (Cl. 214—505)

This invention relates to trailer structures and is more particularly directed to boat trailers and its principal object is to provide a frame and wheels mounted on the frame with a cradle pivotally supported thereon whereby the cradle may be selectively lowered or raised in an extremely convenient manner.

Another object of the present invention is to provide a trailer for boats and the like including a vertically swingable cradle mounted on a frame of the trailer whereby the cradle can be lowered to a position so as not to require any lifting of a boat to place it on the cradle.

Another object of the present invention is to provide a trailer for boats and the like including a swingable cradle whereby a single winch is utilized to first draw a boat onto the cradle and when the boat is properly housed, then swing the cradle upwardly to a position permitting the towing of the trailer.

A further object of the present invention is to provide a boat trailer with a pivoted cradle which normally supports a boat along the hull on each side of the center keel in its raised position and when the cradle is pivoted to its lower position for launching the boat, the keel is received by a roller mounted on the frame which roller lifts the boat from the cradle.

A still further object of the present invention is to provide a trailer for boats and the like which is simple in construction and operation, strong and reliable in use, inexpensive in cost and otherwise well adapted for the purposes for which the same is intended.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a top plan view of a drop cradle trailer for boats and the like constructed in accordance with my invention.

Figure 2 is a side elevational view with a wheel broken away and a boat shown positioned thereon; the solid line indicating its cradle assembly in towing position while the dotted line indicating the position of the cradle when it has been lowered for launching or retrieving a boat.

Figure 3 is a rear elevational view.

Figure 4 is an enlarged detailed view of a spring assembly.

Figure 5 is a sectional view taken along the line 5—5 of Figure 4 with the dotted lines indicating the spring assembly in its lowered position.

Figure 10 is a fragmentary top plan view of a further modified structure of my drop cradle trailer adapted for larger sized boats.

Figure 11 is a fragmentary side elevational view thereof.

Figure 12 is a fragmentary perspective view.

Figure 13 is a cross sectional view taken along the line 13—13 of Figure 10.

Figure 14 is a perspective fragmentary view of the combination cable and collar device for raising and lowering the cradle.

Figure 6:
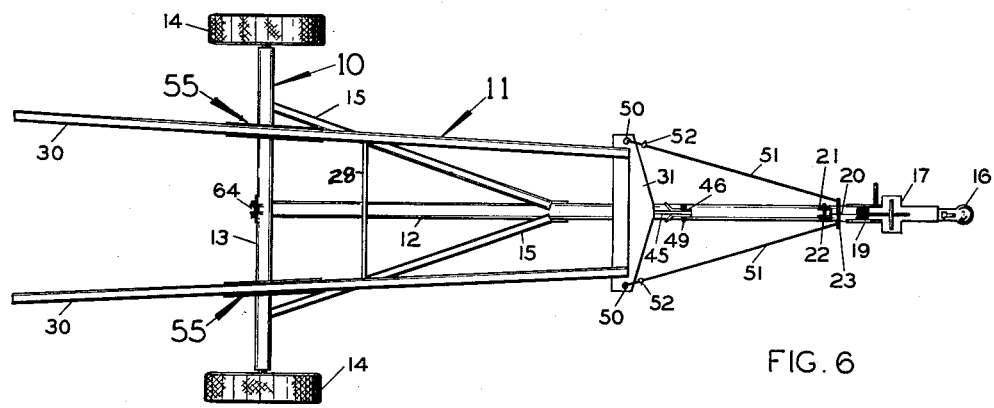
Figure 6 is a top plan view of my trailer showing a modified construction.

Referring to the drawings and in particular to Figures 1–5 inclusive wherein like numerals are used to designate similar parts throughout the several views, there is shown a boat trailer constructed in accordance with my invention and consisting of a frame structure 10 and a cradle structure 11. The frame structure 10 comprises a longitudinal member 12 mounted along the longitudinal axis of the frame structure 10 secured as by welding and the like at its rear end portion to the midportion of a cross member 13 with wheels 14 rotatably mounted at the free ends of the cross member 13. A pair of diagonal braces 15 extend forwardly from the cross member 13 to the longitudinal member 12 for strengthening the frame structure 10. At the forward end portion of the longitudinal member 12 there is secured a conventional releasable coupler 16 known as a tow hitch for connecting the trailer to a motor vehicle for towing same.

Mounted slightly rearwardly of the tow hitch 16 is an upright winch support 17 which is adjustably secured to the longitudinal member 12 by a U-bolt 18. A conventional hand operated winch 19 which is mounted on the upper portion of the winch support 17 is provided with a winch cable 20 at whose free end there is secured a boat fastening device 21 provided with a locking pin 22. The winch cable 20 extends through a bore in a collar 23 and slides freely therethrough, but the boat fastener 21 due to its bulk will abut against the collar 23 when brought into proximity thereto as is explained in detail hereinafter.

Means are provided on the frame structure 10 for receiving the keel of a boat when the latter is being launched or retrieved comprising a pair of guide rollers 24 rotatably mounted in tandem along the centerline of the frame structure 10. The guide rollers 24 are mounted between support plates 25 which are pivotally secured as at 27 to a support 26 welded to the cross member 13, so that when a keel of a boat is received by the guide rollers 24, 24 the roller support plates 25, 25 will pivot about the pivot pin 27 until both rollers 24 are in contact with the keel of the boat. Then, as the boat is moved along the frame structure, the keel will ride on both the rotating rollers 24.

The cradle structure 11 consists of a pair of cradle beams 30 preferably made of wood though metal covered with a fabric material may be used. The cradle beams 30 are canted slightly toward each other at the forward portion of the trailer in order to properly contact and support a boat hull and are joined together at their forward ends by a cross head 31. A tie rod 32 extends between the cradle beams 30 securing them together and extending through the upper portion of spring assemblies 33 of which are two. Each spring assembly 33 is mounted in vertical alignment with the cradle beams 30 and have their lower portions pivotally secured to the cross member 13.

As best shown by Figures 4 and 5 each of the spring assemblies 33 consists of support plates 34 secured on either side of the cradle beams 30 and depending therebelow with a U-shaped upper spring bracket 35 pivotally secured to the support plates 34 by the tie rod 32 extending through bores in the aforesaid members 34 and 35. Secured to the lower portion of the bracket 35 is a rod or keeper 36 extending through a bore 37 in a lower bracket 38. A coil spring 39 extends between the upper and lower brackets 35, 38 resiliently urging the cradle assembly 11 upwardly, the keeper 36 being prevented from leaving the bracket 38 by an enlarged head 40. The lower bracket 38 is pivotally mounted by a pivot pin 41 to tabs 42 which are secured to the cross member 13. From the above description it is noted that the springs 39 act as shock absorbers.

Means are provided for releasably securing the cradle structure 11 in its elevated position comprising a tongue 45 secured to the cross head 31 and extending forwardly and downwardly in the direction of the longitudinal member 12 to be received by a locking member 46. The locking member 46 and the tongue 45 are provided with bores 47 and 48 which when aligned are locked together by a locking pin 49.

At each side of the cross head 31 is a bore 50 which receives one end of a cable 51, the other ends being secured to the collar 23. The free ends of the cables 51 are secured and adjusted by clamps 52.

In the normal operation of my trailer described hereinabove and shown by Figures 1–5, when a boat 53 is housed thereon as shown by Figure 2, the trailer and boat is in position to be towed by a motor vehicle. The trailer may then be backed to a water's edge in preparation to launch the boat 53. With outboard motors and other equipment in the stern of the boat 53, the boat 53 will be heavy at the stern so that when the locking pin 49 is removed from the locking plate 46, the cradle assembly 11 will pivot slightly downwardly at the stern about the pivot rod 32. Now as the winch 19 is turned to pay out the cable 20, the cradle assembly 11 including the boat 53 will swing rearwardly of the trailer about the pivot pins 41, with the stern portion of the cradle assembly 11 pivoting in a downward direction about the pivot rod 32 and the forward portion of the cradle assembly 11 in an upward direction. As the cable 20 is continued to be unwound from the winch 19, the cradle assembly 11 will assume the dotted line position shown in Figure 2 and the keel of the boat 53 will be received by the rollers 24. The boat 53 will then be lifted off the cradle beams 30 and as the cable 20 is payed out, the boat 53 will roll rearwardly of the cradle assembly 11 on the rollers 24. The stern of the boat 53 will become immersed in water and then as the boat 53 continues to roll rearwardly on the rollers 24, the boat 53 becomes water borne and finally and stem of the boat 53 will roll off the rollers 24 and be free of the cradle assembly 11 except for the cable 20 which is still attached to a bow eye bolt 54 on the bow of the boat 53. The pin securing the boat fastening device 21 to the eye bolt 54 is removed thereby completing the launching of the boat 53.

To retrieve a boat onto the trailer the boat 53 is brought bow first in the general proximity of the rear portion of the trailer which is normally positioned at a water's edge with the cradle assembly 11 as shown by the dotted lines of Figure 2. The cable 20 is payed out of winch 19 sliding freely through the collar 23 to permit the boat fastening device 21 to be secured to the eye bolt 54 at the bow of the boat 53. The handle of the winch 19 is rotated until the boat 53 is brought to the stern of the trailer when the stem or keel of the boat 53 is placed on the rollers 24. As the winch 19 is actuated to wind the cable 20 thereon, the boat 53 will be pulled forwardly along the cradle assembly 11 while the keel of the boat 53 is rolling on the rollers 24 and the cable 20 is sliding freely through the collar 23, the cradle beams 30 remaining stationary all of this time. When the boat 53 has arrived at a certain position with relation to the cradle beams 30, the boat fastening device 21 will have engaged the collar 23 and the cradle cable 51 has become taut. Now any further winding of the winch cable 20 on the winch 19 will compel the cradle assembly 11 to swing about the pivot pins 41, pulling the cradle assembly 11 forwardly and upwardly and lifting the boat 53 off the rollers 24. The boat 53 is now supported completely by the cradle beams 30. When the cradle assembly 11 has reached the forward position as shown by solid lines in Figure 2, the tongue 45 of the cradle assembly 11 will be received by the locking member 46. The locking pin 47 is then placed through bores in the members 45 and 46 to lock the cradle assembly 11 in position on the frame assembly 10. The boat is now properly housed on the trailer and the springs 39 will act as shock absorbers as the trailer is being towed.

Figure 7:
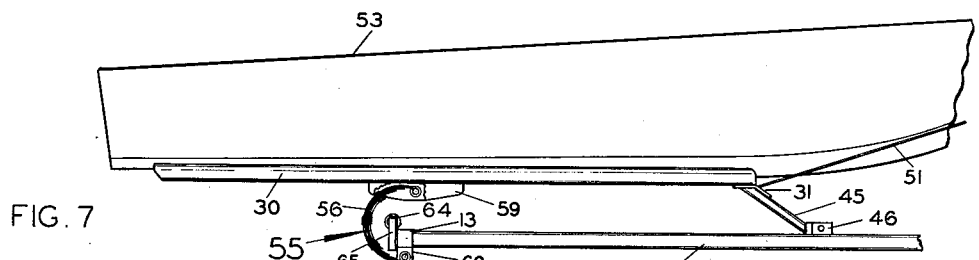
Figure 7 is a side elevational view thereof.
Figure 8:
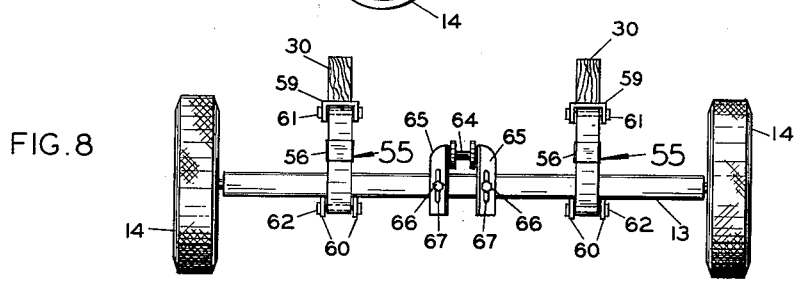
Figure 8 is a rear elevational view.
Figure 9:
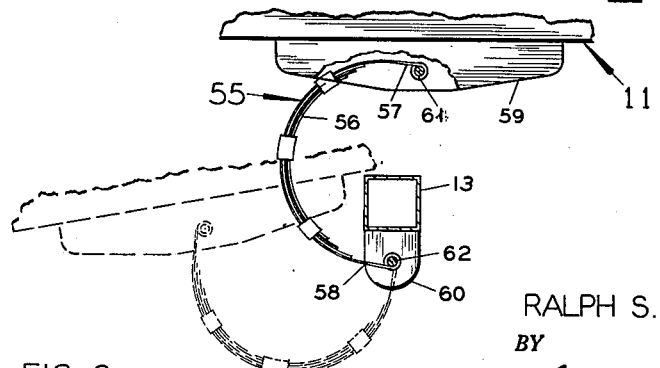
Figure 9 is a detailed view of its spring assembly showing its lowered position in dotted lines.

The modified structure of my trailer that is shown in Figures 6–9 inclusive is substantially similar to that shown and described hereinbefore, the difference in construction being in a simplified spring assembly 55 of the cradle structure 11 in lieu of the spring assembly 33 shown in Figures 1–5 inclusive. The spring assemblies 55 consist of an arcuate leaf spring 56 somewhat similar to leaf springs utilized in motor vehicles with end portions 57 and 58 pivotally mounted to brackets 59 and 60 by pivot pins 61 and 62 respectively. The upper brackets 59 are U-shaped and secured to the lower surface of the cradle beams 30 while the brackets 60 are in the form of a pair of ears or tabs secured to cross beam 13. Similar to the previously described trailer, there is mounted along the centerline of the frame assembly 10 a roller 64 whose function is identical with the previously described roller 24. The roller 64 is however, rotatably mounted between a pair of upright supports 65, 65 which are adjustably secured to the cross beam 13 by bolts 66 extending through elongated bores 67 on the support members 65, 65. A tie rod 28 secures the cradle beams 30, 30 together at approximately their midportions.

The cradle 11 of my trailer shown by Figures 6–9 inclusive operates to launch and retrieve the boat 53 in the identical manner as the trailer shown by Figures 1–5 inclusive and described hereinabove. By especially noting Figure 9, it can be seen that the cradle 11 is supported by the spring assemblies 55 which normally act as shock absorbers. When the cradle assembly 11 is moved from its upper to its lowered position, the spring assemblies 55 pivot about the lower and upper pivot pins 62 and 61 as the upper portion of the springs 55 swings rearwardly to lower the cradle assembly 11 along with the boat 53. The boat 53 normally rests on the cradle beams 30 and when the spring assemblies 55 assume their lower position, the keel of the boat is received by the roller 64 and the boat is lifted away from the cradle beams 30 in the same manner as described in connection with the boat trailer described hereinbefore.

I show a further modification of my trailer in Figures 10–12 inclusive wherein there is shown a trailer 70 shown in part constructed primarily for carrying large or heavy boats. The frame structure of the trailer 70 consists of a longitudinal member 71 secured at its rear portion by bolts 73 to the mid portion of a cross beam 72. Also secured together by the bolts 73 are a roller support member 74 and a pair of axles 75 which extend outwardly beyond the ends of the cross member 72 and at whose free ends wheels 76 are rotatably mounted. Spaced inwardly of each pair of wheels 76 is a leaf spring 77 extending between the axles 75, 75 with the ends of the springs 77 pivotally mounted as at 78 to a bracket 79 secured to the axles 75. The ends of the cross beam 72 rest on the mid portion of the leaf springs 77 and are secured together by shackle bolts 80. On the upper portion of the roller support 74 is a roller 81 whose function is to receive the keel of a boat when the cradle assembly is in its lowered position. Brace members 82 extend diagonally from the cross member 72 to the longitudinal member 71.

The cradle assembly of this modification consists of a pair of cradle beams 83 extending forwardly and joined together at their forward ends in the same manner as described hereinabove in connection with my previously described trailers. At approximately the position of the cross beam 72 is an upright link or pivot arm 84 whose lower end is pivoted as at 85 to a bracket secured to the side wall of the cross beam 72 and the upper end is bifurcated as at 86 and pivoted by a pivot pin 87 to each of the cradle beams 83. The remaining structure of this trailer is substantially identical with the structures of the previously described trailers.

The trailer 70 operates in the same manner to retrieve and launch a boat. When a boat housed on the trailer 70 is to be launched, the cradle beams 83 swing rearwardly and downwardly at the stern to the dotted line position shown by Figure 11 as the pivot arms 84 pivot about the pivot pins 85 until the keel of the boat is received by the roller 81 and lifts the boat off the cradle beams 83. The boat is then ready to be launched. In retrieving a boat the reverse procedure as described in connection with my trailer shown by Figures 1–5 inclusive comes into effect. Also, as with my previously described trailer structures, the springs 77 act as shock absorbers.

Having described my invention, what I claim as new is:

1. A drop cradle trailer comprising a wheeled base frame, a cradle positioned above said frame, elongated support means having one end pivotally secured to said base frame and the other end pivotally secured to said cradle, locking means releasably securing said cradle to said wheeled base frame against pivotal movement of said cradle on said base frame, a winch mounted on said frame, a cable wound on said winch, collar means, said cable extending through said collar means, boat fastening means secured to the free end of said cable, said cable fastening device adapted to engage said collar means when said cable is wound on said winch and adjustable cable means connecting said collar means and said cradle.

2. A drop cradle trailer comprising a wheeled base frame, a pair of cradle beams extending longitudinally above said base frame, a pair of depending brackets, a pivot rod extending through said depending brackets pivotally mounting said brackets to said cradles, a pair of lower brackets, pivot means mounting said brackets to said base frame, said lower brackets having a bore, a rod secured to each of said depending brackets and extending through said bore of said lower brackets, means mounted on the free end of said rods to prevent said rod from leaving said lower bracket, spring means encircling each of said rods and extending between said brackets, a cross beam connecting forward end portions of said cradle beams, interengaging locking means mounted on said cross beam and said base frame to prevent the pivotal movement of said cradle beams on said base frame, a winch support adjustably mounted on said base frame, a winch mounted on said winch support, a cable positioned on said winch, a collar, said cable extending through said collar, a boat fastening device secured to the free end of said cable, said boat fastening device adapted to engage said collar when said cable is wound on said winch, adjustable means connecting said collar and said cross beam, and a keel receiving roller mounted on said base frame.

3. A drop cradle trailer comprising a wheeled base frame, cradle means positioned above said wheeled base frame, a depending bracket secured to said cradle means, a lower bracket secured to said wheeled base frame, an elongated resilient member, pivot means securing both ends of said elongated resilient member to said depending and lower brackets, releasable locking means means securing said cradle means to said wheeled base frame, a winch having a cable mounted on said base frame, a boat fastening device secured to a free end of said cable, a collar, said cable extending through said collar, a cable connecting said collar and said cradle means, and a keel receiving roller mounted on said base frame.

4. A drop cradle trailer comprising a wheeled base frame, a pair of cradle beams extending longitudinally above said base frame, a depending bracket secured to each of said cradle beams, a pair of lower brackets secured to said base frame, a pair of arcuate leaf springs, pivot means securing one end of each of said leaf springs to said depending brackets and the other ends to said lower brackets, a cross beam connecting forward end portions of said cradle beams, interengaging locking means mounted on said cross beam and said base frame to prevent the pivotal movement of said cradle beams on said base frame, a winch support adjustably mounted on said base frame, a winch mounted on said winch support a cable positioned on said winch, a collar, said cable extending through said collar, a boat fastening device secured to the free end of said cable, said boat fastening device adapted to engage said collar when said cable is wound on said winch, adjustable means connecting said collar and said cross beam, and a keel receiving roller mounted on said base frame.

5. A drop cradle trailer comprising a longitudinally disposed frame member, a frame cross beam, bolt means securing one end of said longitudinal frame member to substantially the mid portion of said frame cross beam, a pair of cradle beams extending longitudinally above said frame member, a pair of brackets secured to said frame cross beam in alignment with said cradle beams, a pair of pivot arms, pivot means securing one end of said pivot arms to said brackets and the other ends of said cradle beams, a cradle cross beam connecting forward end portions of said cradle beams, a keel receiving roller mounted on substantially the mid portion of said frame cross beam, a pair of axles extending transversely of said longitudinal frame member means securing said axles at their mid portion to said frame cross beam with the ends terminating on each side of said frame cross beam, a bracket secured to each axle adjacent the ends, a pair of leaf springs, pivot means securing the ends of said leaf springs to said brackets, shackle means securing the ends of said frame cross beam to substantially the mid portion of said leaf springs, wheels rotatably mounted on said axles and interengaging locking means mounted on said cradle cross beam and said longitudinal frame member to prevent the pivotal movement of said cradle beams on said frame cross beam.

6. A drop cradle trailer comprising a longitudinally disposed frame member, a frame cross beam, bolt means securing one end of said longitudinal frame member to substantially the mid portion of said frame cross beam, a pair of cradle beams extending longitudinally above said frame member, a pair of brackets secured to said frame cross beam in alignment with said cradle beams, a pair of pivot arms, pivot means securing one end of said pivot arms to said brackets and the other ends of said cradle beams, a cradle cross beam connecting forward end portions of said cradle beams, a keel receiving roller mounted on substantially the mid portion of said frame cross beam, a pair of axles extending transversely of said longitudinal frame member means securing said axles at their mid portion to said frame cross beam with the ends terminating on each side of said frame cross beam, a bracket secured to each axle adjacent the ends, a pair of leaf springs, pivot means securing the ends of said leaf springs to said brackets, shackle means securing the ends of said frame cross beam to substantially the mid portion of said leaf springs, wheels rotatably mounted on said axles and interengaging locking means mounted on said cradle cross beam and said longitudinal frame member to prevent the pivotal movement of said cradle beams on said frame cross beam, a winch support adjustably mounted on said longitudinal frame member, a winch mounted on said winch support, a cable positioned on said winch, a collar, said cable extending through said collar, a boat fastening device secured to the free end of said cable, said cable fastening device adapted to engage said collar when said cable is wound on said winch and adjustable means connecting said collar and said cradle cross beam.

References Cited in the file of this patent

UNITED STATES PATENTS

| | | |
|---|---|---|
| 2,107,064 | Peterman | Aug. 22, 1939 |
| 2,170,064 | Peterman | Aug. 22, 1939 |
| 2,485,793 | Vassar | Oct. 25, 1949 |
| 2,754,129 | Eckroad | July 10, 1956 |
| 2,834,492 | Roy et al. | May 13, 1958 |
| 2,835,401 | Byrd | May 20, 1958 |